United States Patent [19]

Chen

[11] Patent Number: 5,495,682
[45] Date of Patent: Mar. 5, 1996

[54] DYNAMOELECTRIC SHOES

[76] Inventor: Shi-Hiu Chen, 5F-1, No. 564, Sec. 1, Chung-Te Rd., Taichung City, Taiwan

[21] Appl. No.: 396,711

[22] Filed: Mar. 1, 1995

[51] Int. Cl.⁶ ..................................................... A43B 7/04
[52] U.S. Cl. .................. 36/2.6; 36/137; 219/211
[58] Field of Search .............................. 36/2.6, 137, 139; 219/211

[56] References Cited

U.S. PATENT DOCUMENTS

| | | | |
|---|---|---|---|
| 1,506,282 | 8/1924 | Barbieri | 219/211 X |
| 4,507,877 | 4/1985 | Vaccari et al. | 36/2.6 |
| 4,674,199 | 6/1987 | Lakic | 36/2.6 |
| 4,697,359 | 10/1987 | Balbinot | 36/2.6 |
| 4,780,968 | 11/1988 | Bragagnolo | 36/2.6 |
| 4,782,602 | 11/1988 | Lakic | 36/2.6 |
| 4,837,494 | 6/1989 | Maier | 36/2.6 |
| 4,845,338 | 7/1989 | Lakic | 36/2.6 |
| 4,941,271 | 7/1990 | Lakic | 36/2.6 |
| 5,167,082 | 12/1992 | Chen | 36/2.6 |

*Primary Examiner*—Paul T. Sewell
*Assistant Examiner*—Ted Kavanaugh
*Attorney, Agent, or Firm*—Sughrue, Mion, Zinn, Macpeak & Seas

[57] ABSTRACT

A dynamoelectric shoe includes a shoe sole having a heel portion formed with a compartment unit, a pressure-operated electric generator unit provided inside the compartment unit, and a rechargeable battery unit. The electric generator unit includes a hollow base, a pivot plate mounted pivotally in the hollow base, a volute spring biasing the pivot plate so as to position normally the latter in an upwardly inclining position, a driving gear secured to the pivot plate, a unidirectional gear set meshing with the driving gear, a speed increasing gear set driven rotatably by the unidirectional gear set, a press plate having a rear end mounted pivotally on an open top of the hollow base and a front end provided with a push plate which extends into the open top of the hollow base and which abuts against the pivot plate, and an alternator unit which has a rotor drive shaft that is driven by the speed increasing gear set. The alternator unit produces a voltage signal when the rotor drive shaft rotates due to repeated application of pressure on the press plate during use. The rechargeable battery unit is connected electrically to the alternator unit and includes an electrical socket mounted on the shoe sole. The rechargeable battery unit is charged by the voltage signal from the alternator unit.

7 Claims, 10 Drawing Sheets

DYNAMOELECTRIC SHOES

BACKGROUND OF THE INVENTION

1. Field of the Invention

The invention relates to a shoe construction, more particularly to a dynamoelectric shoe which incorporates a pressure-operated electric generator unit for converting the energy that is exerted by the user while walking into electricity which can be used to charge a rechargeable battery cell for operating an electrical device.

2. Description of the Related Art

U.S. Pat. No. 5,167,082 by the applicant discloses a dynamoelectric shoe which comprises a shoe sole that confines a watertight compartment, a pressure-operated electric generator unit that is provided inside the watertight compartment adjacent to a heel portion of the shoe sole and that produces a voltage signal when pressure is applied repeatedly on the shoe sole during use, and a power outlet unit that includes an electrical socket mounted on the shoe sole and a rechargeable battery unit connected electrically to the electrical socket and to the electric generator unit, the rechargeable battery unit being charged by the voltage signal from the electric generator unit.

The rechargeable battery unit includes a rechargeable battery cell connected to the electrical socket, a battery charger circuit receiving the voltage signal from the electric generator unit so as to charge the rechargeable battery cell, means for deactivating the battery charger circuit so as to stop charging of the rechargeable battery cell when the voltage across the battery cell exceeds a predetermined limit, a supplementary current supplying circuit for providing additional current to the electrical socket when a plug is inserted into the electrical socket, means for detecting if the plug is inserted into the electrical socket, and means for deactivating the supplementary current supplying circuit when the plug is not inserted into the electrical socket.

The electric generator unit comprises a base plate, a press plate having a horizontal press portion and an inclined portion extending rearwardly from the press portion, one end of the inclined portion being pivoted on the base plate, a compression spring provided between the inclined portion and the base plate to bias the press plate away from the base plate, a driving shaft extending downwardly from the press portion, a speed increasing gear assembly actuated rotatably by upward and downward movement of the driving shaft when pressure is applied repeatedly on the press portion during use, and an alternator unit having a rotor driven rotatably by the gear assembly so as to produce the voltage signal. A rectifier circuit is connected to the alternator unit so as to rectify the voltage signal.

SUMMARY OF THE INVENTION

The object of the present invention is to provide a dynamoelectric shoe which has a pressure-operated electric generator unit that is relatively simple in construction and that is capable of producing electricity for operating an electrical device.

Accordingly, a dynamoelectric shoe of the present invention comprises:

a shoe sole having a heel portion formed with a compartment unit;

a pressure-operated electric generator unit provided inside the compartment unit, the electric generator unit including a hollow base with a longitudinal partition plate provided therein, a pivot plate disposed in the hollow base on one side of the partition plate, the pivot plate having one end fixed to a shaft which extends through the partition plate and which mounts pivotally the pivot plate to the hollow base, a volute spring having one end connected to the shaft and biasing the shaft so as to position normally the pivot plate in an upwardly inclining position, a driving gear secured on a distal end of the shaft, a unidirectional gear set including a smaller gear wheel which meshes with the driving gear and a larger gear wheel, a speed increasing gear set driven rotatably by the larger gear wheel of the unidirectional gear set, a press plate having a rear end that is mounted pivotally on an open top of the hollow base and a front end that is provided with a downwardly projecting push plate which has a distal end that extends into the open top of the hollow base and that abuts against the pivot plate, and an alternator unit which is disposed in the hollow base and which has a rotor drive shaft that is provided with a gear member which meshes with the speed increasing gear set, the alternator unit producing a voltage signal when the gear member rotates due to repeated application of pressure on the press plate during use; and a rechargeable battery unit connected electrically to the alternator unit and provided in the compartment unit of the hollow base, the rechargeable battery unit including an electrical socket mounted on the shoe sole and being charged by the voltage signal from the alternator unit.

Preferably, the hollow base has a side panel opposite to the partition plate and formed with an oval-shaped axle hole. The unidirectional gear set further has a gear axle with a first end mounted pivotally on the partition plate and a second end extending into the oval-shaped axle hole. The speed increasing gear set includes a smaller gear wheel which is driven rotatably by the larger gear wheel of the unidirectional gear set and a larger gear wheel which meshes with the gear member of the alternator unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
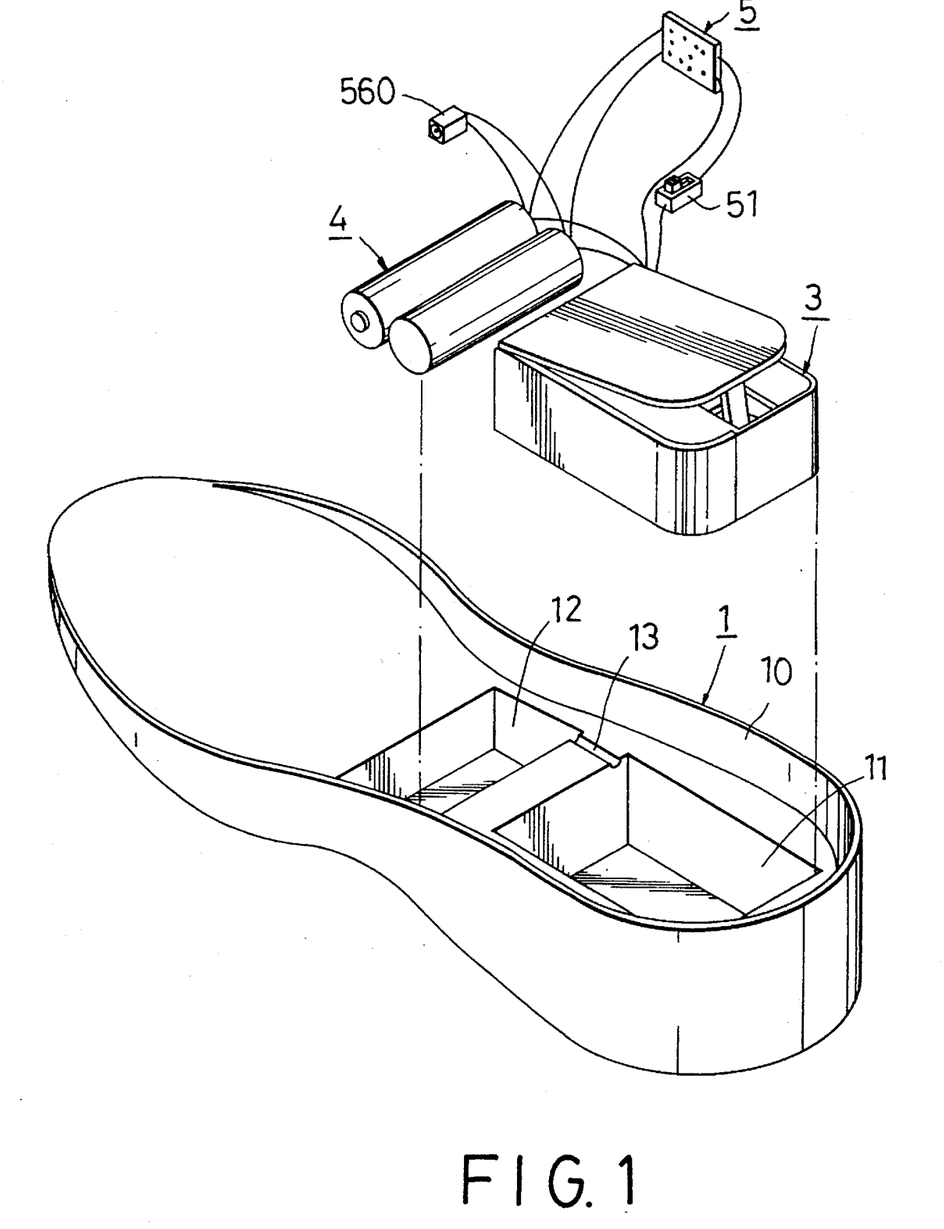
FIG. 1 is an exploded view of the preferred embodiment of a dynamoelectric shoe according to the present invention.
Figure 2:
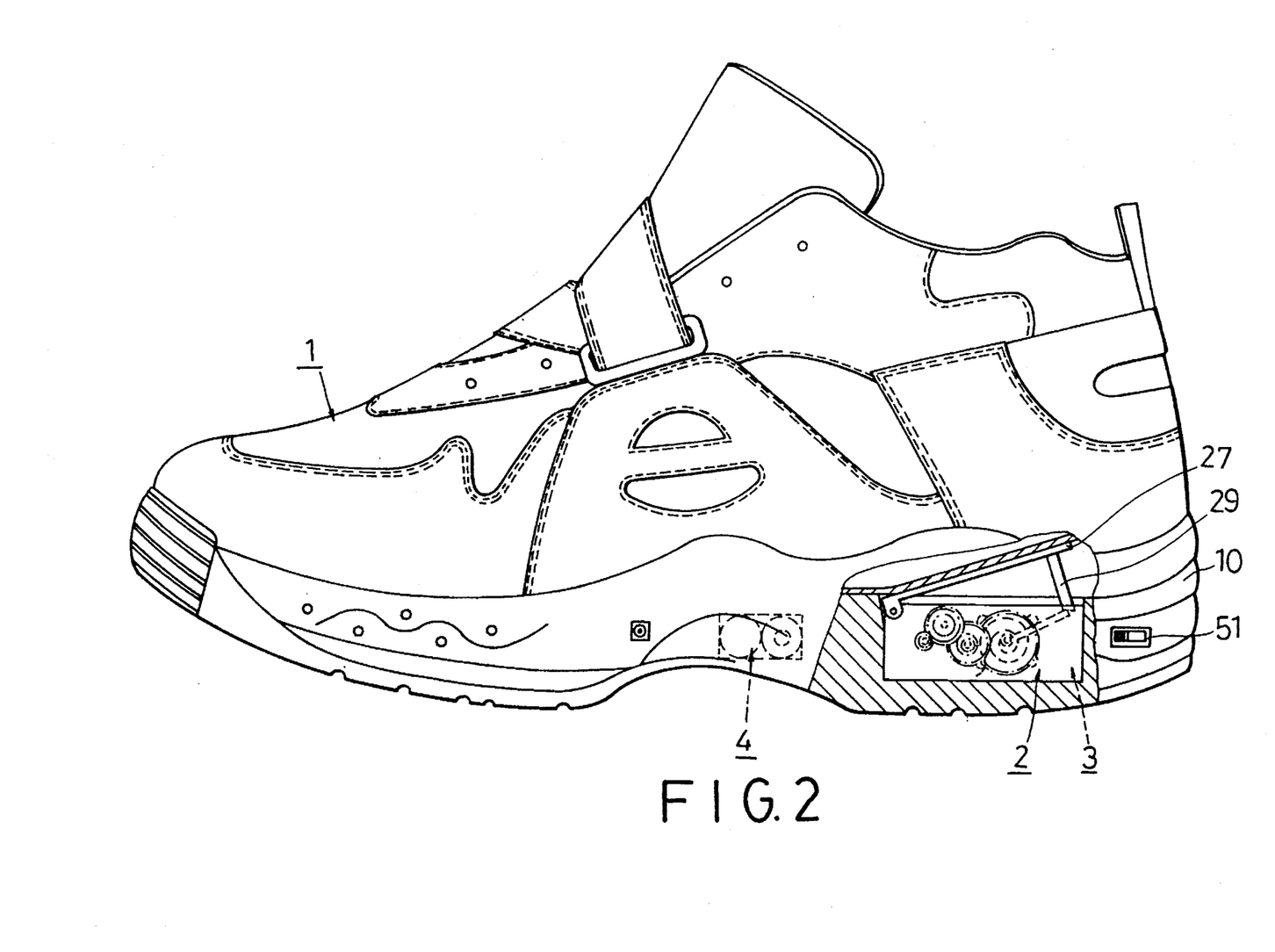
FIG. 2 is a schematic side view of the preferred embodiment.

Referring to FIGS. 1 and 2, the preferred embodiment of a dynamoelectric shoe 1 according to the present invention is shown to have a shoe sole 10 which is formed with a first compartment 11 adjacent to a heel portion, a second compartment 12 for receiving rechargeable battery cells 4 of a rechargeable battery unit therein, and a wire passage 13 which extends from the first compartment 11 to the second compartment 12. A pressure-operated electric generator unit 3 and a circuit board 5 which has circuit components of the rechargeable battery unit mounted thereon are provided in the first compartment 11.

Figure 3:
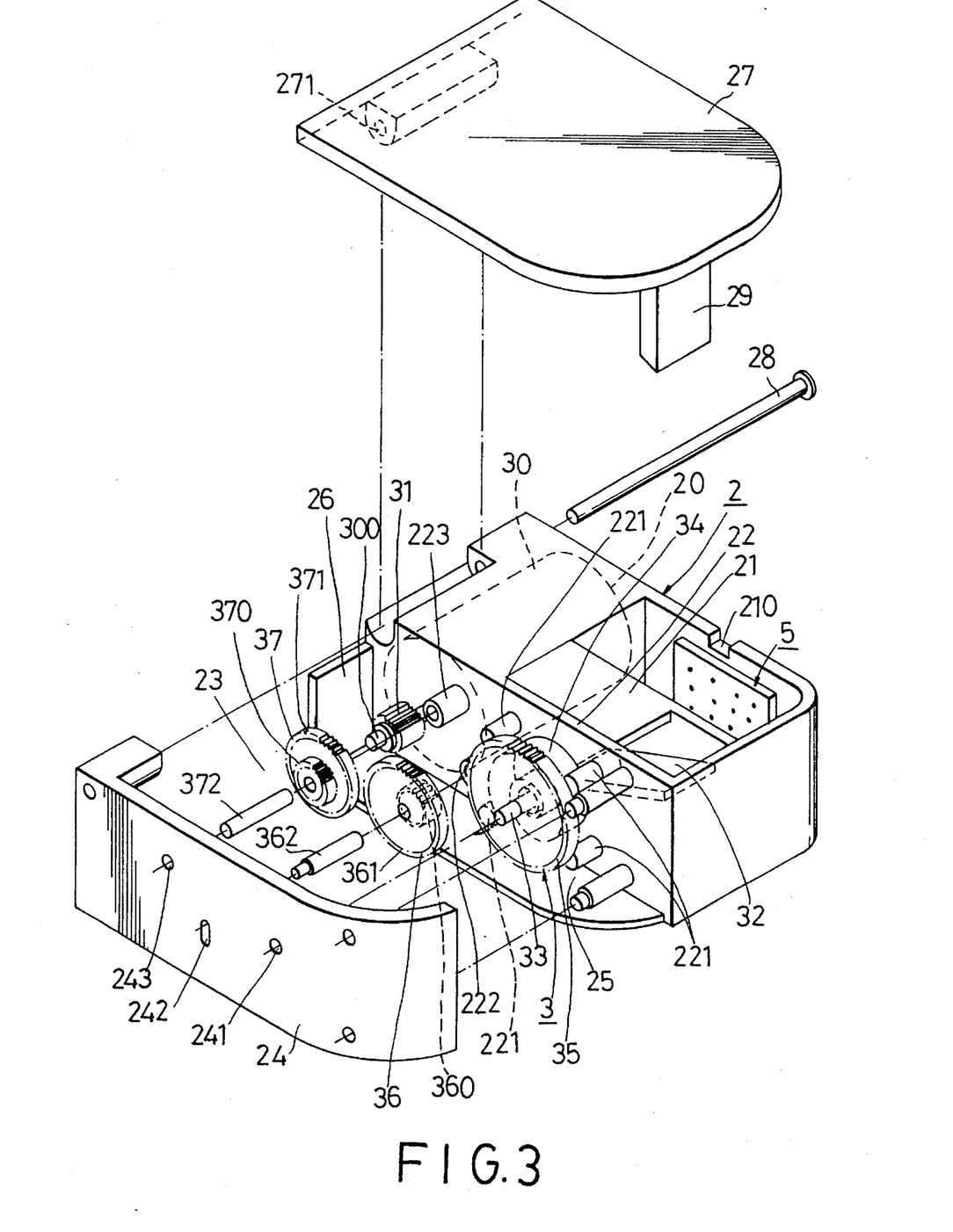
FIG. 3 is a partly exploded view of a pressure-operated electric generator unit of the preferred embodiment.
Figure 4:
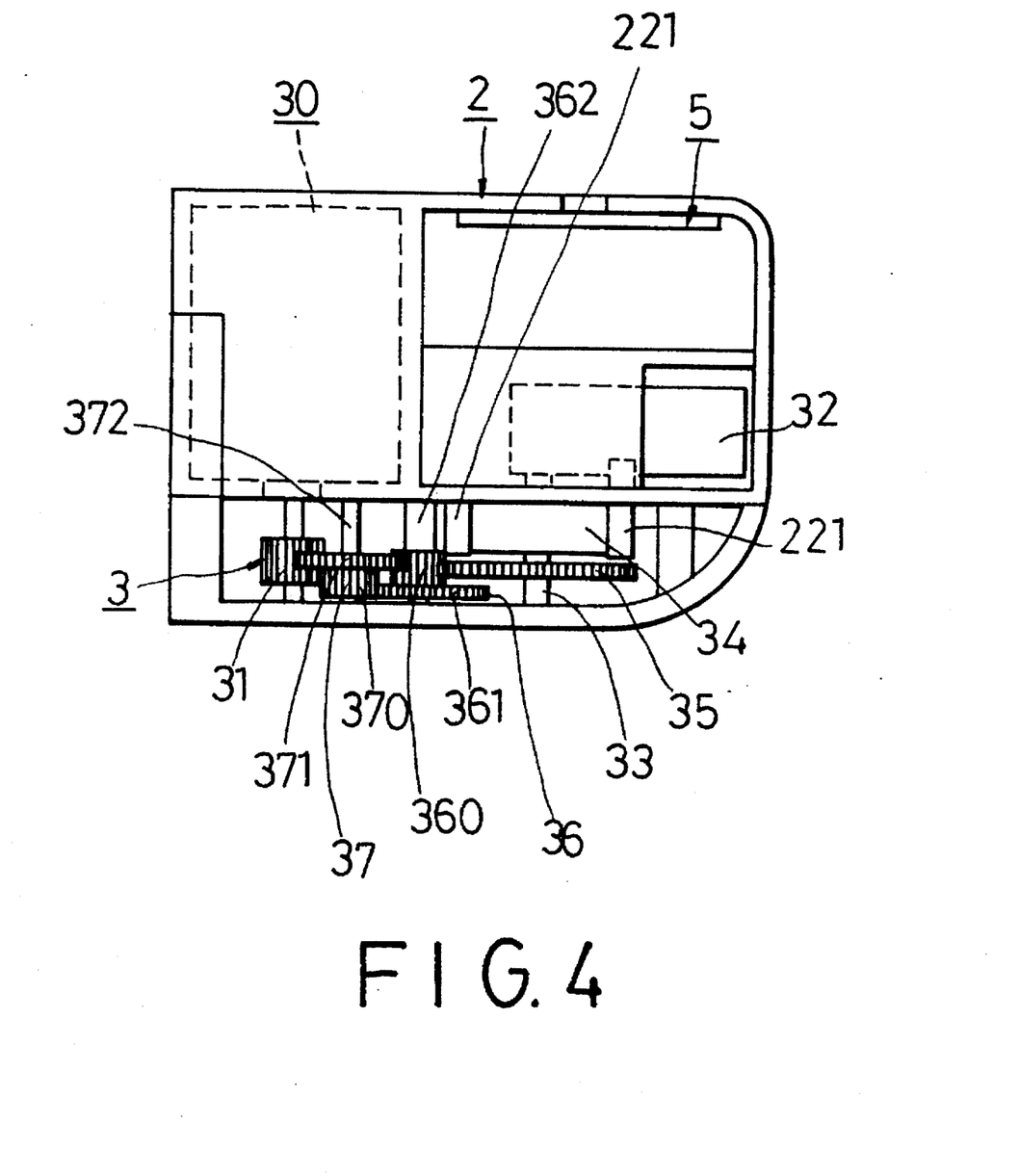
FIG. 4 is a top view illustrating the assembly of the electric generator unit shown in FIG. 3.

Referring to FIGS. 2 and 3, the pressure-operated electric generator unit 3 includes a generally rectangular hollow base 2 which is divided by a longitudinal partition plate 22. The hollow base 2 has a detachable side panel 24 which is disposed on one side of the partition plate 22 and which cooperates with the partition plate 22, a bottom plate 25 and a rear end plate 26 of the hollow base 2 so as to confine a transmission space 23 there among. The hollow base 2 further has a drive space 21 and a receiving chamber 20 on the other side of the partition plate 22 opposite to the transmission space 23. A side wall of the hollow base 2 opposite to the partition plate 22 and adjacent to the drive space 21 is formed with a notch 210 at a top edge. The partition plate 22 is formed with a pivot shaft 222, an axle hole 223 and a plurality of limit projections 221 that extend toward the side panel 24. The side panel 24 is formed with three axle holes 241, 242, 243. The axle hole 242 of the side panel 24 is aligned with the pivot shaft 222 and is generally oval-shaped.

A pivot plate 32 is disposed in the drive space 21 and has one end fixed to a shaft 33. The shaft 33 extends into the transmission space 23 through the partition plate 22. A volute spring 34 is disposed in the transmission space 23 and has an innermost end connected to the shaft 33. The volute spring 34 further has an outermost end which is bent so as to be retained between the bottom plate 25 of the hollow base 2 and one of the limit projections 221. The volute spring 34 biases the shaft 33 so that the pivot plate 32 is disposed normally in an upwardly inclining position in which the pivot plate 32 abuts against an upper one of the limit projections 221. A driving gear 35 is similarly disposed in the transmission space 23 and is secured to a distal end of the shaft 33. The driving gear 35 drives rotatably a unidirectional gear set 36. The unidirectional gear set 36 includes a gear axle 362, a smaller gear wheel 360 secured on the gear axle 362, and a larger gear wheel 361 similarly secured on the gear axle 362 and formed integrally on one side of the smaller gear wheel 360. The gear axle 362 has one end which extends into a shallow and slightly wide cavity formed in a distal end of the pivot shaft 222, thereby mounting pivotally the gear axle 362 on the partition plate 22. The other end of the gear axle 362 extends into the axle hole 242 on the side panel 24. The smaller gear wheel 360 meshes with the driving gear 35. The larger gear wheel 361 drives rotatably a speed increasing gear set 37. The speed increasing gear set 37 includes a gear axle 372 with two ends that extend respectively into the axle holes 223, 243 of the partition plate 22 and the side panel 24, a smaller gear wheel 370 secured on the gear axle 372, and a larger gear wheel 371 similarly secured on the gear axle 372 and formed integrally on one side of the smaller gear wheel 370. The smaller gear wheel 370 is driven rotatably by the larger gear wheel 361 of the unidirectional gear set 36.

An alternator unit 30 is disposed in the receiving chamber 20 of the hollow base 2. The alternator unit 30 has a rotor drive shaft 300 which extends into the transmission space 23 and which is provided with a gear member 31 that meshes with the larger gear wheel 371 of the speed increasing gear set 37.

A press plate 27 is provided on an open top of the hollow base 2. The press plate 27 has a rear end which is provided with a downwardly extending pivot lug 271. A pivot pin 28 extends through the pivot lug 271 to mount pivotally the rear end of the press plate 27 to the open top of the hollow base 2. The press plate 27 further has a front end which is provided with a downwardly extending push plate 29. The push plate 29 of the push plate 27 has a distal end which extends into the open top of the hollow base 2 and which abuts against the pivot plate 32.

Figure 5:
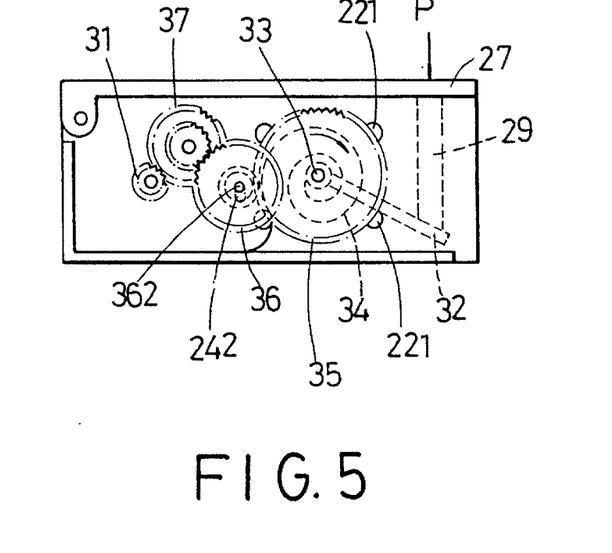
FIG. 5 illustrates the electric generator unit when pressure is applied on the same.

Referring to FIG. 5, when a force (P) is applied on the press plate 27, the push plate 29 pushes the pivot plate 32 downwardly until the latter abuts against a lower one of the limit projections 221. The volute spring 34 is wound, and the driving gear 35 rotates with the shaft 33 in a clockwise direction. The driving gear 35 drives rotatably the unidirectional gear set 36 and, at the same time, causes the gear axle 362 of the unidirectional gear set 36 to pivot to the upper end of the oval-shaped axle hole 242 in order to enable the unidirectional gear set 36 to mesh with the speed increasing gear set 37 so as to rotate the latter. Rotation of the speed increasing gear set 37 causes corresponding rotation of the gear member 31, thereby rotating the rotor drive shaft of the alternator unit 30 in order to enable the latter to generate a voltage output.

Figure 6:
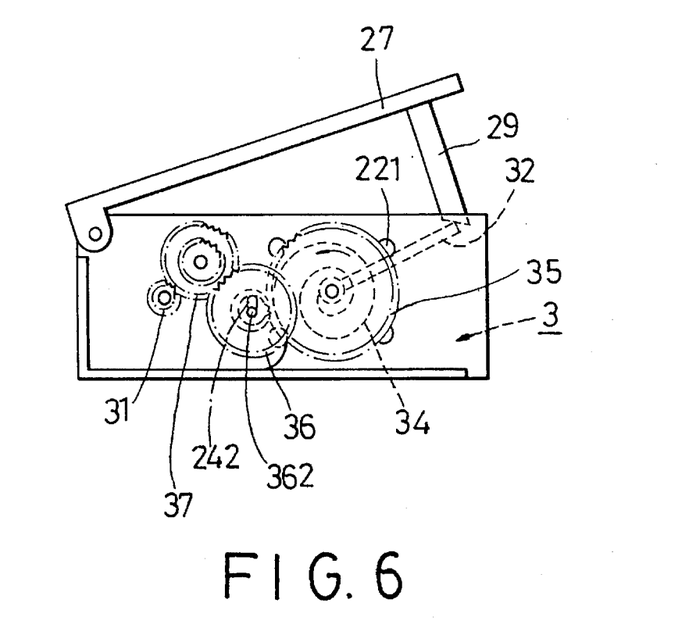
FIG. 6 illustrates the electric generator unit when the pressure that was applied thereon is relieved.

Referring to FIG. 6, when the force (P) on the press plate 27 is relieved, the volute spring 34 unwinds to return the pivot plate 32 to the normal upwardly inclining position. The driving gear 35 rotates with the shaft 33 in a counterclockwise direction. The driving gear 35 drives rotatably the unidirectional gear set 36 and, at the same time, causes the gear axle 362 of the unidirectional gear set 36 to pivot to the lower end of the oval-shaped axle hole 242 in order to enable the unidirectional gear set 36 to disengage the speed increasing gear set 37. Thus, the gear member 31 of the alternator unit 30 does not rotate at this stage.

Figure 7:
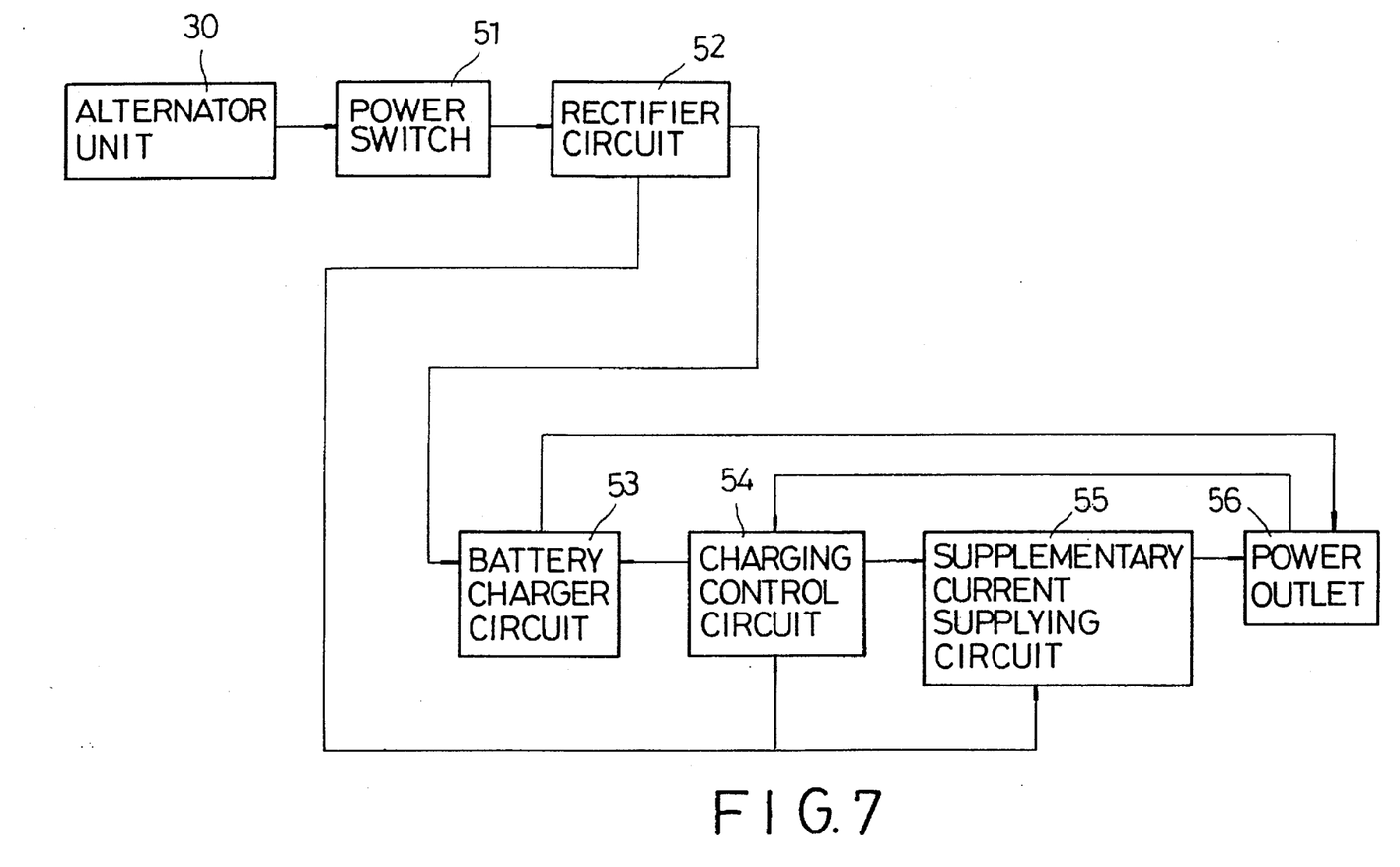
FIG. 7 is a schematic circuit block diagram of a rechargeable battery unit of the preferred embodiment.
Figure 8:
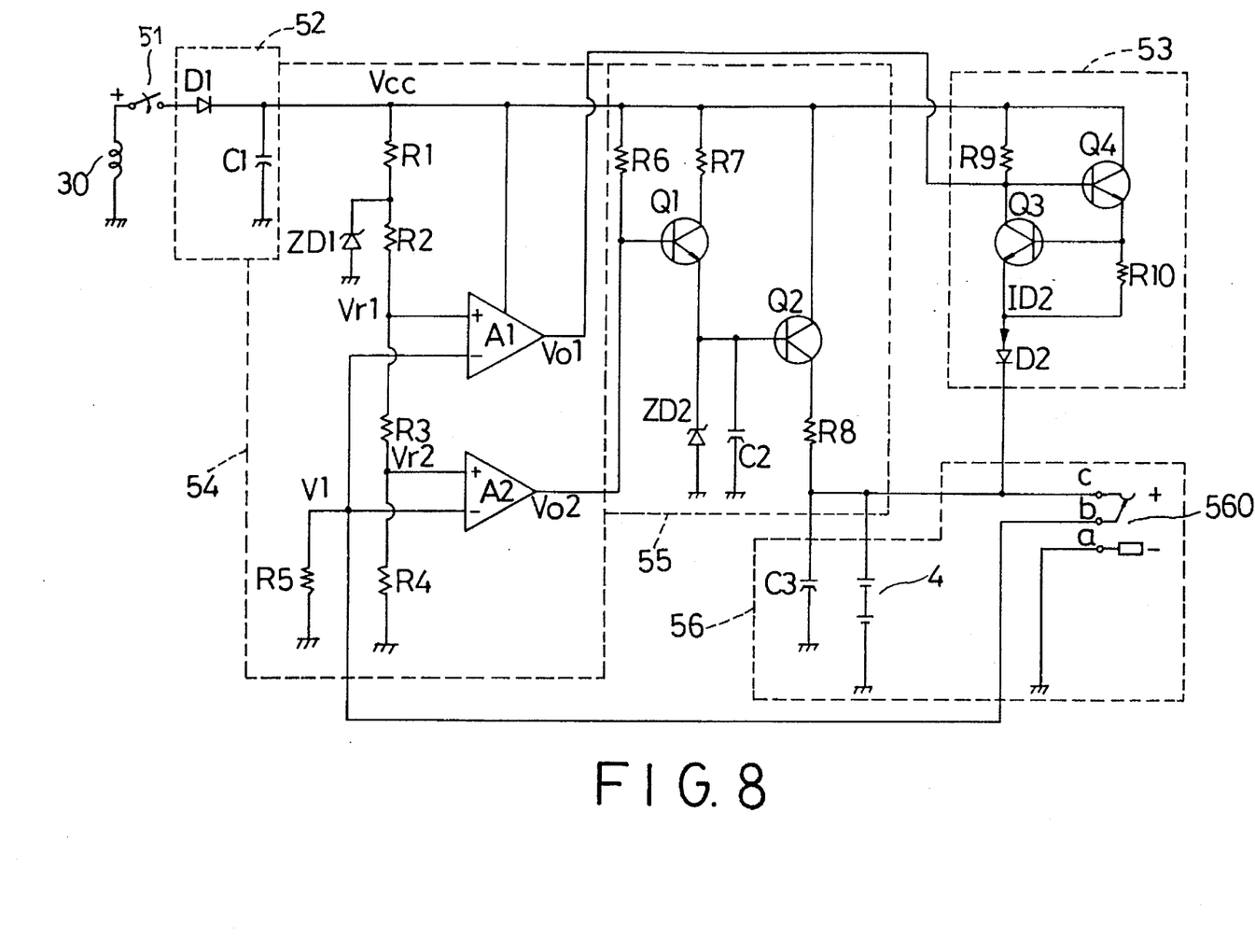
FIG. 8 is a schematic electrical circuit diagram corresponding to the schematic circuit block diagram shown in FIG. 7.

Referring once more to FIGS. 1 and 2, a power switch 51 is mounted on the sole 10 and connects electrically the alternator unit 30 to the rechargeable battery unit. Referring to FIGS. 7 and 8, the rechargeable battery circuit comprises a rectifier circuit 52 connected electrically to the alternator unit 30 by means of the power switch 51, a battery charger circuit 53, a charging control circuit 54, a supplementary current supplying circuit 55, and a power outlet 56 including an electrical socket 560. The rectifier circuit 52, the battery charger circuit 53, the charging control circuit 54 and the supplementary current supplying circuit 55 are mounted on the circuit board 5 which is secured to one of the side walls of the hollow base 2.

Referring to FIG. 8, in use, the power switch 51 is closed to establish electrical connection between the alternator unit 30 and the rectifier circuit 52. The voltage output of the alternator unit 30 is rectified by the rectifier circuit 52, which is a half-wave rectifier circuit that includes a diode (D1) and a capacitor (C1) connected to the cathode of the diode (D1) so as to filter a rectified voltage output of the latter. A fairly stable dc voltage signal (Vcc) can be measured across the capacitor (C1).

The battery charger circuit 53 is connected to the rectifier circuit 52 and includes a pair of resistors (R9, R10) and a pair of transistors (Q3, Q4). The battery charger circuit 53 acts as a constant current source which charges continuously the rechargeable battery cells 4 until the voltage (V1) across the battery cells 4 exceeds a reference voltage (Vr1) of the charging control circuit 54 to prevent overcharging.

The charging control circuit 54 includes four resistors (R1–R4) and a zener diode (ZD1) which are arranged so as to set a pair of reference voltages (Vr1, Vr2). The charging control circuit 54 further includes a first comparator (A1) having the reference voltage (Vr1) and the battery voltage (V1) as inputs thereto, and a second comparator (A2) having the reference voltage (Vr2) and the battery voltage (V1) as inputs thereto. The output terminal of the first comparator (A1) is connected to the base terminal of the transistor (Q4) of the battery charger circuit 53. When the battery voltage (V1) is greater than the reference voltage (Vr1), the voltage output (Vo1) of the first comparator (A1) is approximately 0 volts. The transistor (Q4) ceases to conduct, and the current (ID2) from the transistor (Q3) is approximately 0 amperes. Charging of the battery cells 4 is thus terminated.

The supplementary current supplying circuit 55 includes resistors (R6–R8), transistors (Q1, Q2), a capacitor (C8) and a zener diode (ZD2). The resistor (R8) serves as a protective unit for the battery cells 4. The output terminal of the second comparator (A2) is connected to the base terminal of the transistor (Q1). The transistor (Q1) has an emitter terminal connected to the base terminal of the transistor (Q2).

Initially, when no plug is inserted into the electrical socket 560, the battery voltage (V1) is greater than the reference voltage (Vr2), and the voltage output (Vo2) of the second comparator (A2) is approximately 0 volts. The transistors (Q1, Q2) do not conduct at this stage.

When a plug is inserted into the electrical socket 560, the contact terminals (b, c) of the electrical socket 560 are open-circuited, while the contact terminals (b, a) of the same are short-circuited. The (V1) inputs of the first and second comparators (A1, A2) are grounded. Current is supplied to a load connected to the electrical socket 560 via the battery cells 4 and the transistor (Q2).

When the dynamoelectric shoe is in a motionless state and no plug is inserted into the electrical socket 560, the battery cells 4 discharge via the resistor (R9). The resistance of the resistor (R9) is relatively large so as to minimize its electrical power consumption.

It has thus been shown that, when the preferred embodiment is in use, the heel of the user repeatedly applies pressure on the pressure-operated electric generator unit 3, thereby generating a dc voltage output which can be tapped via the electrical socket 560 on the sole 1 so as to provide electric power to a portable wireless telephone, a portable radio, a light device to aid the user at night, or to a heating device to warm the user's foot during winter.

Figure 9:
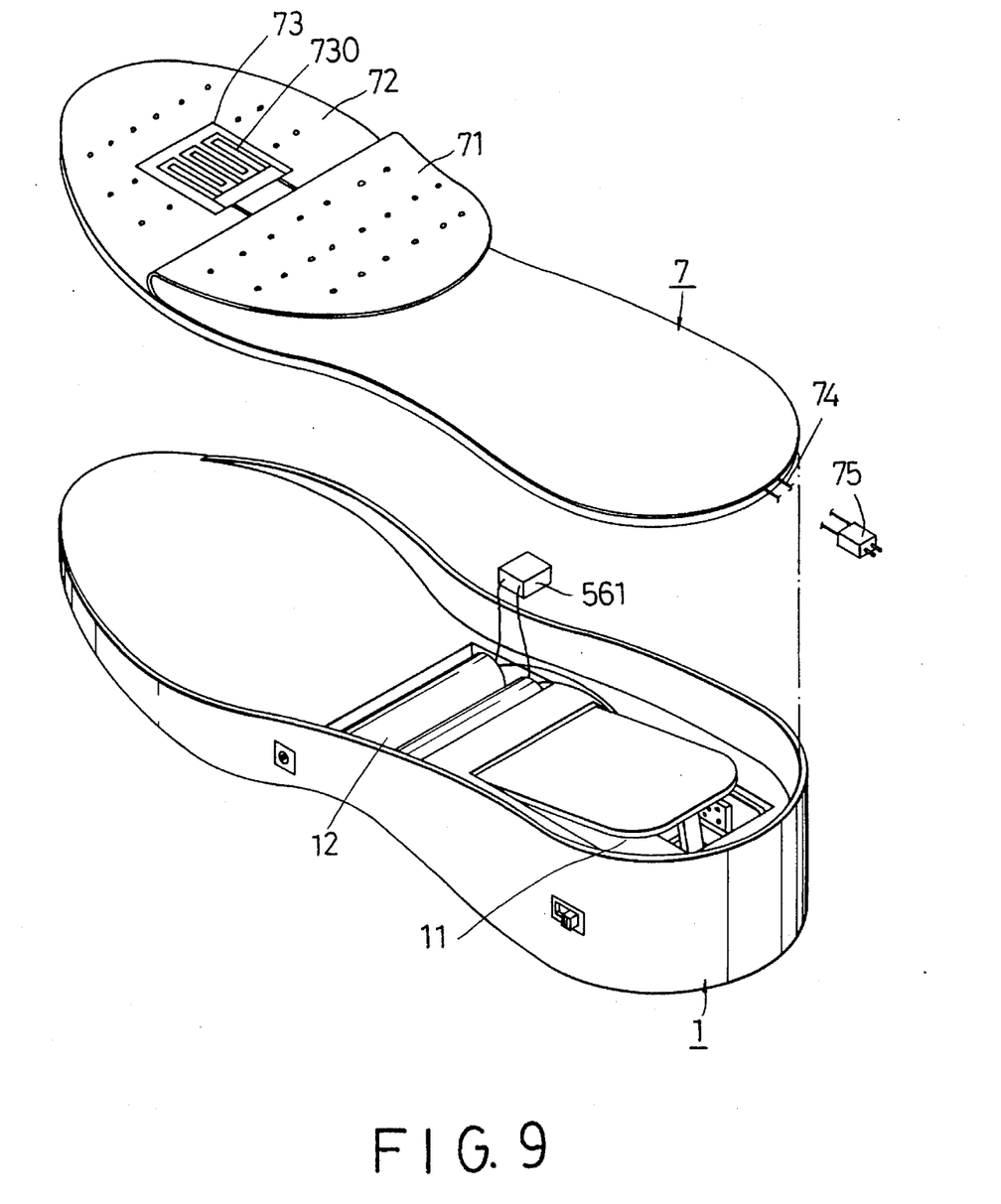
FIG. 9 is an exploded view which illustrates the preferred embodiment when used in combination with a heat generating unit.
Figure 10:
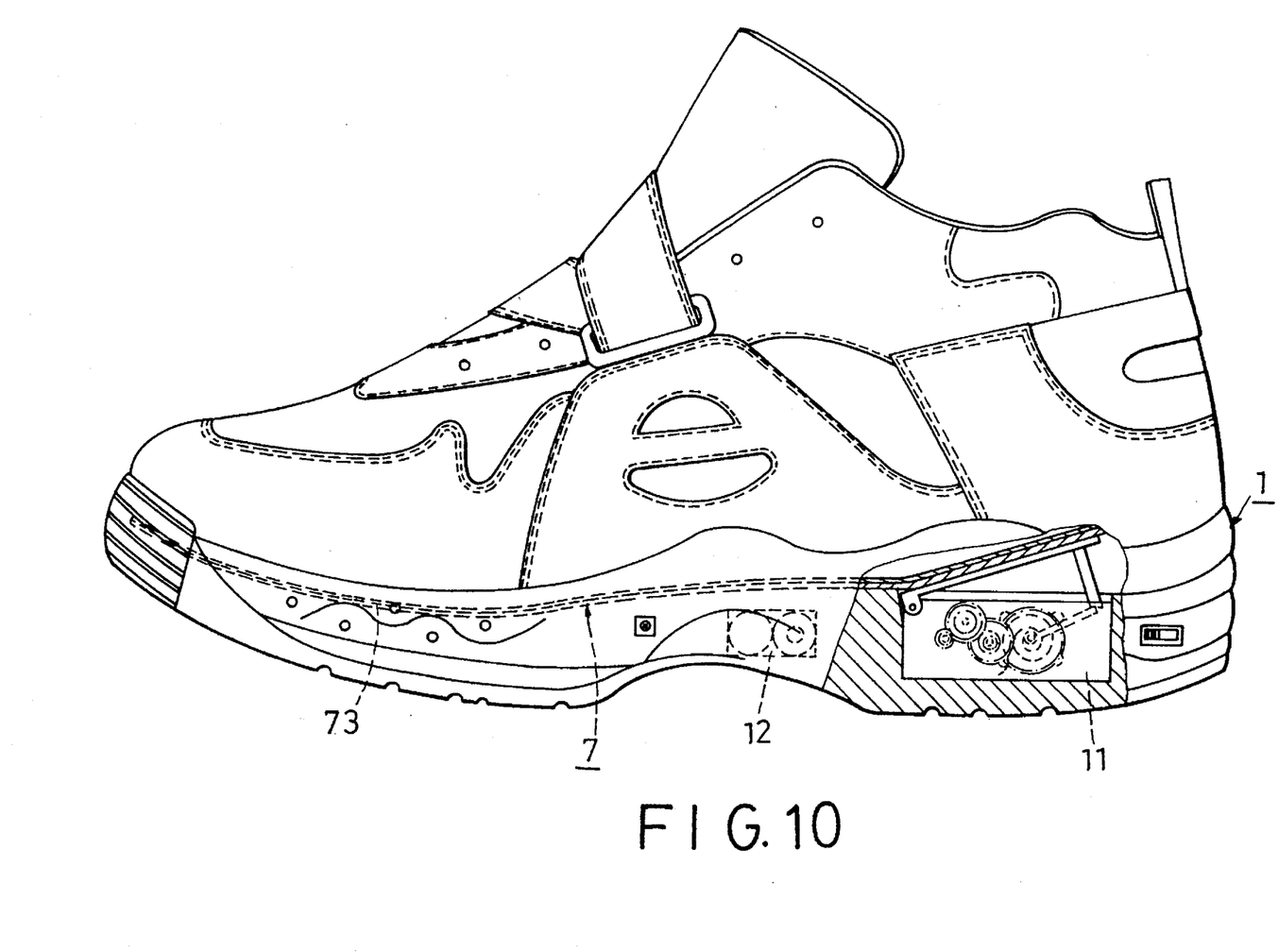
FIG. 10 is a schematic side view which illustrates the preferred embodiment when provided with the heat generating unit.

FIGS. 9 and 10 show the preferred embodiment when used in combination with a heat generating unit 7. The heat generating unit 7 is in the form of an insole that is to be disposed on the sole 1 and that includes upper and lower insole layers 71, 72 and a heating element 73 clamped between the upper and lower insole layers 71, 2. The heating element 73 includes a metal conductor winding 730 which is connected electrically to a socket 5 by means of conducting wires 74. A plug 561 is connectable to the socket 75 and serves to connect electrically the battery cells in the second compartment 12 of the sole 1 to the heating element 73. The heat generating unit 7 provides warmth to the user's foot when the heating element 73 is connected electrically to the battery cells.

Figure 11:
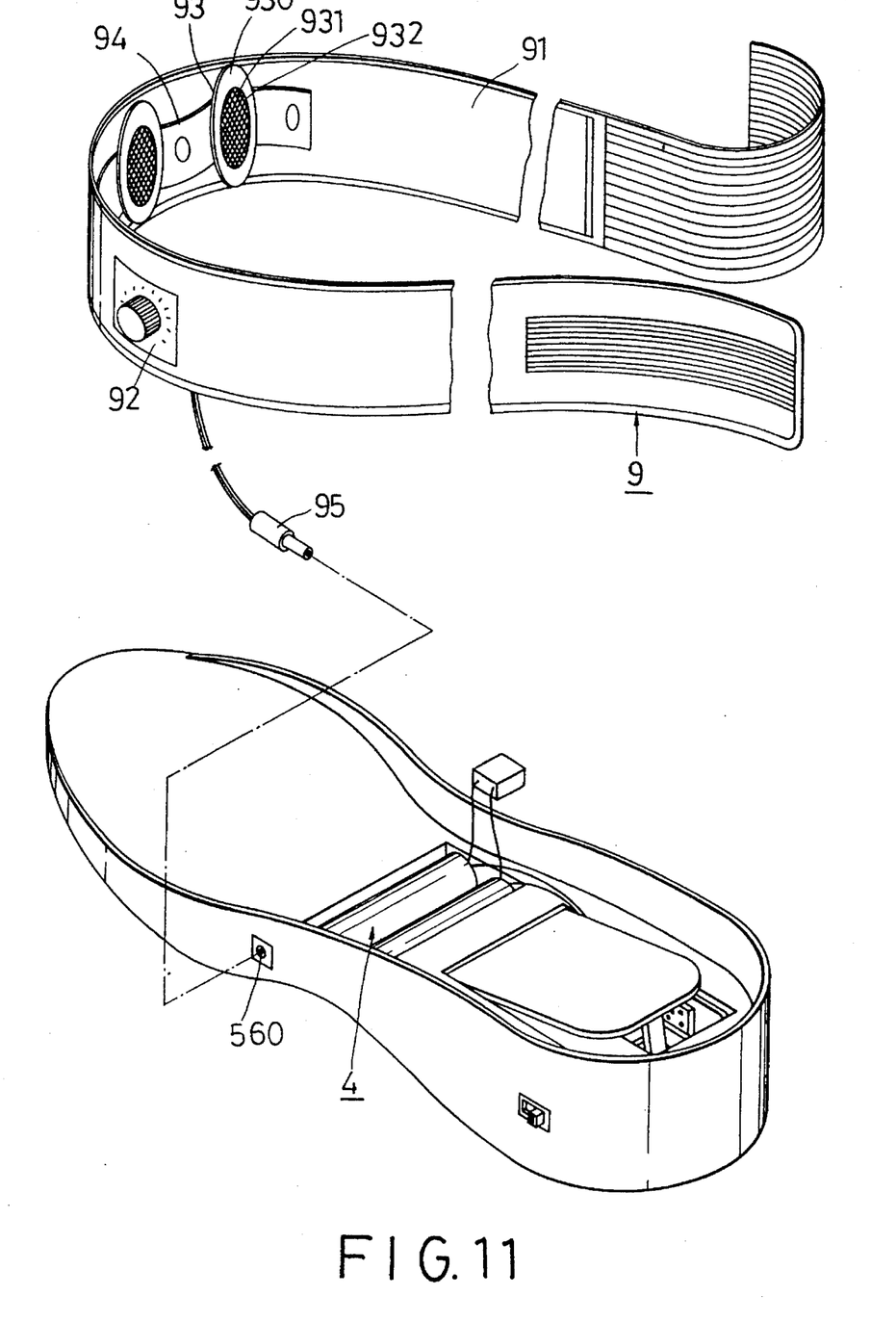
FIG. 11 is an exploded view which illustrates the preferred embodiment when used in combination with a slimming belt.

FIG. 11 is an exploded view which illustrates the preferred embodiment when used in combination with a slimming belt 9. The slimming belt 9 includes a belt body 91 having a control unit 92 and a plurality of applicator pads 93 mounted spacedly thereon. Each applicator pad 93 includes an aluminum film 931 and a sponge layer 932 confined in a PVC ring 930. Conductors 94 interconnect electrically and in series the applicator pads 93 to the control unit 92. The control unit 92 is provided with a plug 95 for electrical connection with the electrical socket 560. The electricity that is generated when the shoe of the present invention is in use supplies the required electric power to operate the slimming belt 9. In use, the applicator pads 93 are moistened, and the control unit 92 is operated so as to provide a series of pulse signals to the applicator pads 93. When the slimming belt 9 is worn around a body part of the user, the applicator pads 93 expand intermittently so as to apply an intermittent muscle contracting action to the body part, thereby stretching and strengthening the muscles of the body part and achieving a slimming effect at the same time.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A dynamoelectric shoe comprising:

a shoe sole having a heel portion formed with a compartment unit;

a pressure-operated electric generator unit provided inside said compartment unit, said electric generator unit including a hollow base with a longitudinal partition plate provided therein, a pivot plate disposed in said hollow base on one side of said partition plate, said pivot plate having one end fixed to a shaft which extends through said partition plate and which mounts pivotally said pivot plate to said hollow base, a volute spring having one end connected to said shaft and biasing said shaft so as to position normally said pivot plate in an upwardly inclining position, a driving gear secured on a distal end of said shaft, a unidirectional gear set including a smaller gear wheel which meshes with said driving gear and a larger gear wheel, a speed increasing gear set driven rotatably by said larger gear wheel of said unidirectional gear set, a press plate having a rear end that is mounted pivotally on an open top of said hollow base and a front end that is provided with a downwardly projecting push plate which has a distal end that extends into said open top of said hollow base and that abuts against said pivot plate, and an alternator unit which is disposed in said hollow base and which has a rotor drive shaft that is provided with a gear member which meshes with said speed increasing gear set, said alternator unit producing a voltage signal when said gear member rotates due to repeated application of pressure on said press plate during use; and a rechargeable battery unit connected electrically to said alternator unit and provided in said compartment unit of said hollow base, said rechargeable battery unit including an electrical socket mounted on said shoe sole and being charged by said voltage signal from said alternator unit.

2. The dynamoelectric shoe as claimed in claim 1, wherein said hollow base has a side panel opposite to said partition plate and formed with an oval-shaped axle hole, said unidirectional gear set further having a gear axle with a first end mounted pivotally on said partition plate and a second end extending into said oval-shaped axle hole;

whereby, when pressure is applied on said press plate, said push plate pushes said pivot plate downwardly to rotate said shaft in a first direction, thereby winding said volute spring and rotating said driving gear therewith to drive rotatably said unidirectional gear set and cause said gear axle of said unidirectional gear set to pivot to an upper end of said oval-shaped axle hole in order to enable said unidirectional gear set to mesh with said speed increasing gear set; and when said pressure on said press plate is relieved, said volute spring unwinds to rotate said shaft in a second direction in order to return said pivot plate to said upwardly inclining position and in order to rotate said driving gear to drive rotatably said unidirectional gear set and cause said gear axle of said unidirectional gear set to pivot to a lower end of said oval-shaped axle hole in order to enable said unidirectional gear set to disengage said speed increasing gear set.

3. The dynamoelectric shoe as claimed in claim 2, wherein said speed increasing gear set includes a smaller gear wheel which is driven rotatably by said larger gear wheel of said unidirectional gear set and a larger gear wheel which meshes with said gear member of said alternator unit.

4. The dynamoelectric shoe as claimed in claim 3, wherein said rechargeable battery unit further comprises:

a rechargeable battery cell connected electrically to said electrical socket;

a battery charger circuit receiving said voltage signal from said alternator unit so as to charge said rechargeable battery cell;

a charging control circuit including means for deactivating said battery charger circuit so as to stop charging of said rechargeable battery cell when voltage across said rechargeable battery cell exceeds a predetermined limit; and a supplementary current supplying circuit for providing additional current to said electrical socket when a plug is inserted into said electrical socket.

5. The dynamoelectric shoe as claimed in claim 4, wherein said rechargeable battery unit further comprises a rectifier circuit connected electrically to said alternator unit so as to rectify said voltage signal.

6. The dynamoelectric shoe as claimed in claim 4, wherein said charging control circuit further comprises means for detecting if said plug is inserted into said electrical socket, and means for deactivating said supplementary current supplying circuit when said plug is not inserted into said electrical socket.

7. The dynamoelectric shoe as claimed in claim 1, further comprising a heat generating unit that is formed as an insole and that is disposed on said shoe sole, said heat generating unit including upper and lower insole layers and a heating element clamped between said upper and lower insole layers, said heating element including a metal conductor winding connectable electrically to said rechargeable battery cell.

* * * * *